(12) United States Patent
Kim

(10) Patent No.: US 8,743,506 B2
(45) Date of Patent: Jun. 3, 2014

(54) RECORDING DISK DRIVING DEVICE

(71) Applicant: Samsung Electro-Mechanics Co., Ltd., Suwon-si (KR)

(72) Inventor: Ju Ho Kim, Suwon (KR)

(73) Assignee: Samsung Electro-Mechanics Co., Ltd., Suwon-Si (KR)

( * ) Notice: Subject to any disclaimer, the term of this patent is extended or adjusted under 35 U.S.C. 154(b) by 0 days.

(21) Appl. No.: 13/707,839

(22) Filed: Dec. 7, 2012

(65) Prior Publication Data

US 2013/0155548 A1 Jun. 20, 2013

(30) Foreign Application Priority Data

Dec. 15, 2011 (KR) .......... 10-2011-0135255

(51) Int. Cl.
*G11B 17/02* (2006.01)

(52) U.S. Cl.
USPC ........................................ 360/99.16

(58) Field of Classification Search
USPC ........................................ 360/99.16, 99.08
See application file for complete search history.

(56) References Cited

U.S. PATENT DOCUMENTS

| | | | | |
|---|---|---|---|---|
| 5,640,290 A * | 6/1997 | Khanna et al. | ............. | 360/99.16 |
| 6,643,251 B1 * | 11/2003 | Ikuta et al. | ............. | 720/703 |
| 6,791,790 B2 * | 9/2004 | Lee | ............. | 360/97.15 |
| 6,948,176 B2 * | 9/2005 | Cho et al. | ............. | 720/600 |
| 7,206,165 B2 * | 4/2007 | Lee | ............. | 360/99.15 |
| 7,986,495 B2 * | 7/2011 | Kamei et al. | ............. | 360/246 |
| 8,339,732 B2 * | 12/2012 | Juang et al. | ............. | 360/99.16 |
| 8,362,365 B2 * | 1/2013 | Ho et al. | ............. | 174/261 |
| 2003/0128645 A1 * | 7/2003 | Cho et al. | ............. | 369/75.1 |
| 2003/0151848 A1 * | 8/2003 | Lee | ............. | 360/97.02 |
| 2003/0193754 A1 | 10/2003 | Yoo et al. | | |
| 2003/0206368 A1 * | 11/2003 | Choi | ............. | 360/97.01 |
| 2005/0041333 A1 * | 2/2005 | Lee | ............. | 360/97.02 |
| 2007/0002491 A1 * | 1/2007 | Lim | ............. | 360/97.02 |
| 2009/0211787 A1 * | 8/2009 | Kamei et al. | ............. | 174/250 |
| 2009/0242259 A1 * | 10/2009 | Ho et al. | ............. | 174/261 |
| 2011/0011626 A1 * | 1/2011 | Yamauchi et al. | ............. | 174/250 |
| 2011/0259632 A1 * | 10/2011 | Oosawa et al. | ............. | 174/266 |
| 2011/0279928 A1 * | 11/2011 | Miura et al. | ............. | 360/244.3 |
| 2012/0241200 A1 * | 9/2012 | Chiyonaga et al. | ............. | 174/255 |
| 2013/0083640 A1 * | 4/2013 | Takahashi et al. | ............. | 369/53.26 |
| 2013/0088948 A1 * | 4/2013 | Kayama et al. | ............. | 369/112.03 |
| 2013/0094337 A1 * | 4/2013 | Yajima et al. | ............. | 369/44.23 |
| 2013/0229729 A1 * | 9/2013 | Yamazaki | ............. | 360/244.2 |

FOREIGN PATENT DOCUMENTS

JP 2010-250912 11/2010
KR 2003-0080875 10/2003

* cited by examiner

*Primary Examiner* — Allen T Cao

(57) ABSTRACT

There is provided a recording disk driving device including a rotor including a rotor hub on which at least one disk is installed, a stator for rotatably supporting the rotor, and a housing including a base member on which the stator is fixedly installed, and an upper case coupled to the base member to form an internal space, wherein the housing is provided with a contact preventing portion formed on a surface of the housing, facing the disk.

4 Claims, 4 Drawing Sheets

RECORDING DISK DRIVING DEVICE

CROSS-REFERENCE TO RELATED APPLICATIONS

This application claims the priority of Korean Patent Application No. 10-2011-0135255 filed on Dec. 15, 2011, in the Korean Intellectual Property Office, the disclosure of which is incorporated herein by reference.

BACKGROUND OF THE INVENTION

1. Field of the Invention

The present invention relates to a recoding disk driving device.

2. Description of the Related Art

As recording disk driving devices have been miniaturized and have been increased in capacity, recoding disk driving devices have been installed as memory units in mobile personal computers (PCs). In addition, recently, a recording disk driving device has been used as a device for recording music, voice, or images in a portable music player or a video camera.

A recording disk driving device generally includes one or more disks driven to rotate at high speed, and a read/write head that contacts a surface of a disk or is suspended thereabove to read information from the disk or write data thereto. In addition, the read/write head is supported by a driver for performing a search process on the disk.

Furthermore, the recording disk driving device includes a housing including an internal enclosed space formed therein, that is, a housing including a base member and an upper case. In this case, the read/write head, the driver, and the disk are installed in the internal enclosed space of the housing.

Recently, as an increasing need to increase the recording capacity of disks has arisen, the number of disks installed in a recoding disk driving device has increased. Accordingly, an interval between a disk and a housing has been reduced.

However, when an interval between a disk and a housing is reduced, the disk may come into contact with the housing in the case of an external shock and can be damaged. That is, when the disk contacts the housing, the disk can be deformed, and thus, data may not be able to be written to or read from the disk by the read/write head.

Related Art Document 1 below discloses a recording disk driving device including an actuator latch device.

RELATED ART DOCUMENT

Korean Patent Laid-Open Publication No. 2003-0080875

SUMMARY OF THE INVENTION

An aspect of the present invention provides a recording disk driving device capable of reducing damage to a disk.

According to an aspect of the present invention, there is provided a recording disk driving device including: a rotor including a rotor hub on which at least one disk is installed; a stator for rotatably supporting the rotor; and a housing including a base member on which the stator is fixedly installed, and an upper case coupled to the base member to form an internal space, wherein the housing is provided with a contact preventing portion formed on a surface of the housing, facing the disk.

The contact preventing portion may be formed of a dynamic pressure groove having a herringbone pattern or a spiral pattern.

The dynamic pressure groove having the herringbone pattern or the spiral pattern may be formed in a rotation direction of the disk.

The contact preventing portion may be disposed to face an edge portion of the disk.

The contact preventing portion may be formed on at least one of an upper surface of the base member and a lower surface of the upper case.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
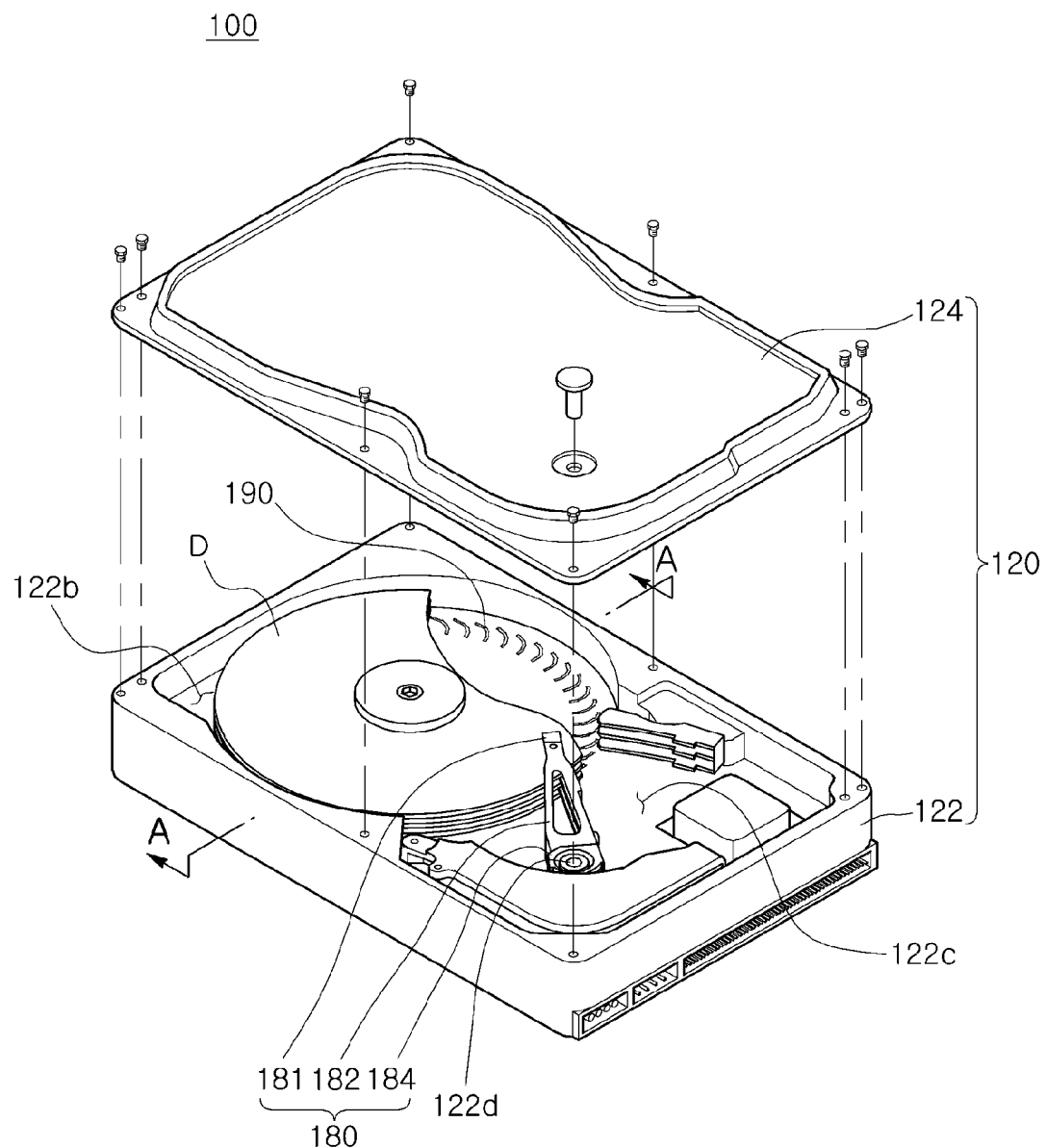
FIG. 1 is a schematic exploded perspective view of a recording disk driving device according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Figure 2:
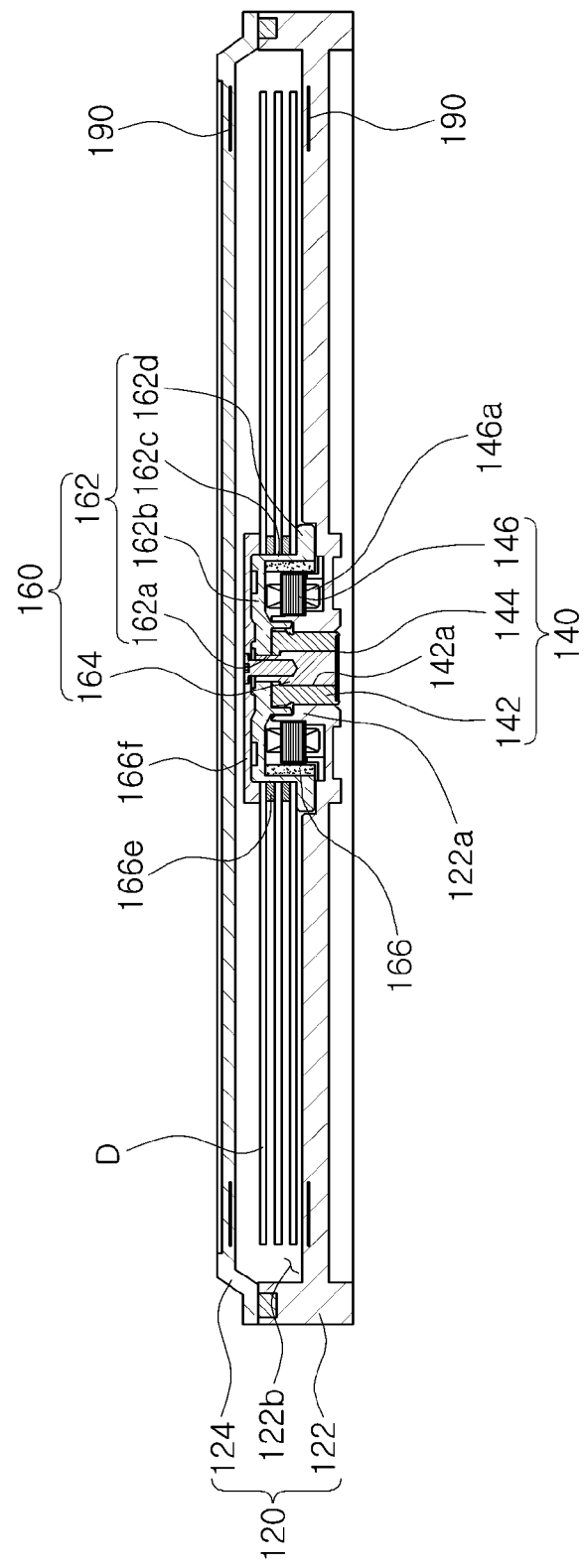
FIG. 2 is a schematic cross-sectional view of the recording disk driving device taken along line A-A' of FIG. 1, according to an embodiment of the present invention.
Figure 3:
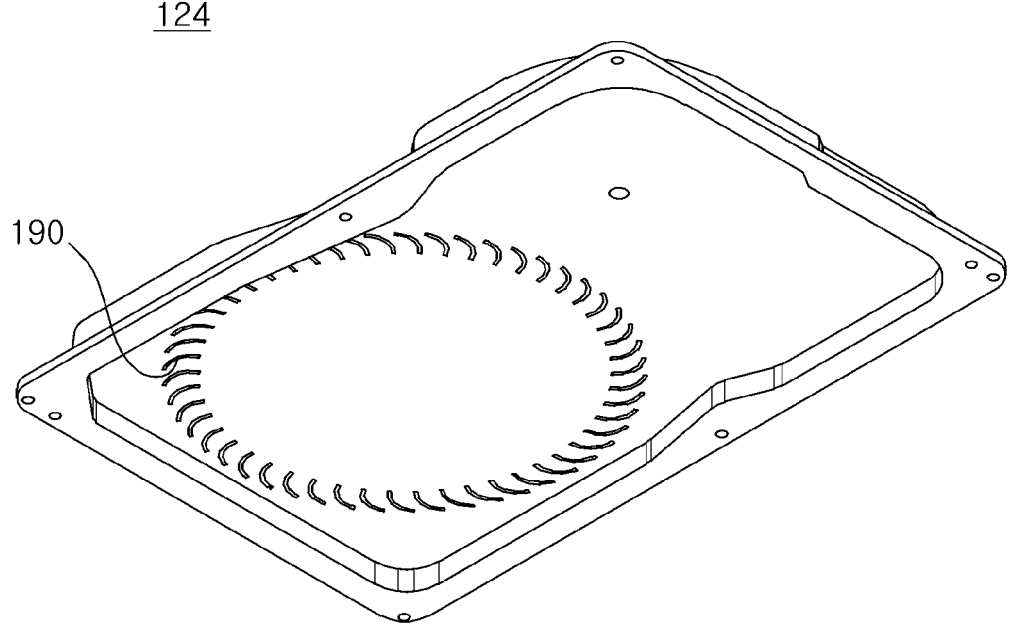
FIG. 3 is a bottom view of an upper case of a housing, according to an embodiment of the present invention.

FIG. 1 is a schematic exploded perspective view of a recording disk driving device 100 according to an embodiment of the present invention. FIG. 2 is a schematic cross-sectional view of the recording disk driving device 100 taken along line A-A' of FIG. 1, according to an embodiment of the present invention. FIG. 3 is a bottom view of an upper case 124 of a housing 120, according to an embodiment of the present invention.

Referring to FIGS. 1 through 3, the recording disk driving device 100 according to an embodiment of the present invention may include the housing 120, a stator 140, a rotor 160, and an actuator 180.

The housing 120 may include a base member 122 on which the stator 140 is fixedly installed, and the upper case 124 coupled to the base member 122 to form an internal space.

That is, the housing 120 may include the base member 122 and the upper case 124. The stator 140, the rotor 160, and the actuator 180 may be disposed in the internal space formed by coupling the base member 122 and the upper case 124 to each other.

A contact preventing portion 190 may be formed on a surface of the housing 120, facing a disk D. The contact preventing portion 190 will be described below in more detail.

The base member 122 may include an installation portion 122a on which the stator 140 is fixedly installed and a disk mounting portion 122b on which the disk D is positioned. That is, the disk mounting portion 122b may be formed to be recessed from an upper surface of the base member 122. In addition, the installation portion 122a on which the stator 140 is fixedly installed may protrude from a central portion of the disk mounting portion 122b.

In addition, the disk mounting portion 122b may have an approximately circular shape so as to correspond to a shape of the disk D.

The contact preventing portion 190 may be formed on a surface of the base member 122, facing the disk D. That is, the contact preventing portion 190 may be formed in the disk mounting portion 122b and may be formed of dynamic pressure grooves having a herringbone or spiral pattern.

In addition, the contact preventing portion 190 formed by the dynamic pressure grooves having a herringbone pattern or the dynamic pressure grooves having a spiral pattern may be formed in a rotation direction of the disk D.

In more detail, with regard to the contact preventing portion 190 formed of the dynamic pressure grooves having a herringbone pattern, bent portions of the dynamic pressure grooves may be formed in the rotation direction of the disk D.

Moreover, with regard to the contact preventing portion 190 formed of the dynamic pressure grooves having a spiral pattern, the dynamic pressure grooves may be formed to be inclined in the rotation direction of the disk D.

In addition, the contact preventing portion 190 may be formed to face an edge portion of the disk D. In other words, the contact preventing portion 190 may be formed on an edge portion of the disk mounting portion 122b.

Thus, when an air dynamic pressure is generated, relatively maximal pressure may be applied to the edge portion of the disk D.

Figure 4:
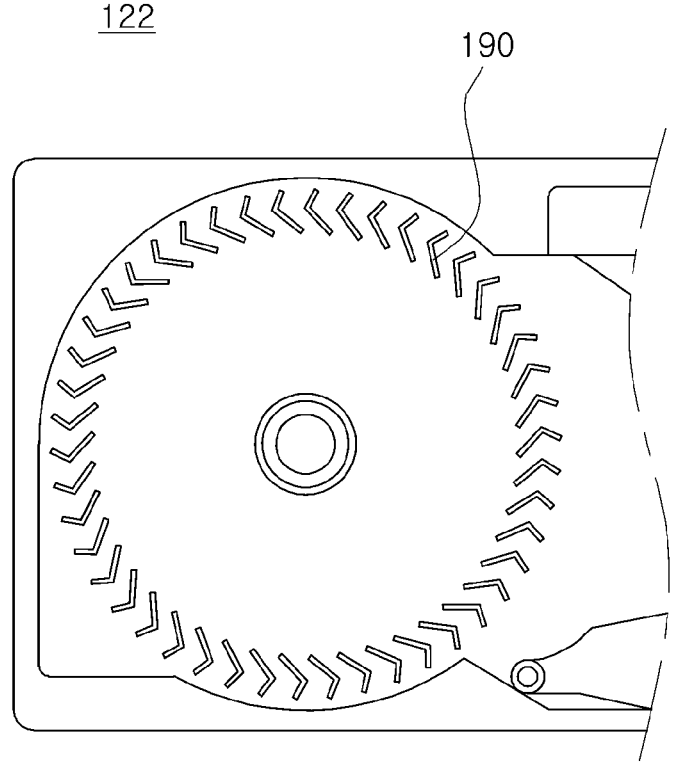
FIGS. 4 and 5 are views of modified examples of a contact preventing portion formed on the housing, according to embodiments of the present invention.

FIG. 1 illustrates a case in which the contact preventing portion 190 is formed of the dynamic pressure grooves having a spiral pattern. Alternatively, as shown in FIG. 4, the contact preventing portion 190 may be formed of the dynamic pressure grooves having a herringbone pattern.

When the base member 122 is manufactured by die casting, the contact preventing portion 190 may be formed in a separate process after the base member 122 has been manufactured. In a case in which the base member 122 is manufactured by a press forming process, the contact preventing portion 190 may also be simultaneously formed with the press forming process by which the base member 122 is formed.

For example, the contact preventing portion 190 formed of the dynamic pressure grooves may have a depth equal to or smaller than 100 μM and a width equal to or smaller than 100 μm.

In addition, the base member 122 may include an actuator installation portion 122c on which the actuator 180 for moving a read/write head (not shown) is disposed. The actuator installation portion 122c may be disposed to be adjacent to the disk mounting portion 122b. The actuator installation portion 122c and the disk mounting portion 122b may be formed to have a step therebetween.

A screw hole for coupling the base member 122 to the upper case 124 may be formed in a side wall of the base member 122.

As described above, the upper case 124 is coupled to the base member 122 to form an internal space. In addition, a screw hole for coupling the upper case 124 to the base member 122 may also be formed in an edge portion of the upper case 124.

That is, the base member 122 and the upper case 124 may be screwed to each other.

The contact preventing portion 190 may also be formed in a surface of the upper case 124, facing the disk D. In addition, the contact preventing portion 190 formed on the upper case 124 may be formed of dynamic pressure grooves having a herringbone or spiral pattern.

In addition, the contact preventing portion 190 formed of the dynamic pressure grooves having a herringbone pattern or the dynamic pressure grooves having a spiral pattern may be formed in a rotation direction of the disk D.

In more detail, with regard to the contact preventing portion 190 formed of the dynamic pressure grooves having a herringbone pattern, bent portions of the dynamic pressure grooves may be formed in the rotation direction of the disk D.

Moreover, with regard to the contact preventing portion 190 formed of the dynamic pressure grooves having a spiral pattern, the dynamic pressure grooves may be formed to be inclined in the rotation direction of the disk D.

In addition, the contact preventing portion 190 may be formed to face an edge portion of the disk D. Thus, when air dynamic pressure is generated, relatively maximal pressure may be applied to the edge portion of the disk D.

Figure 5:
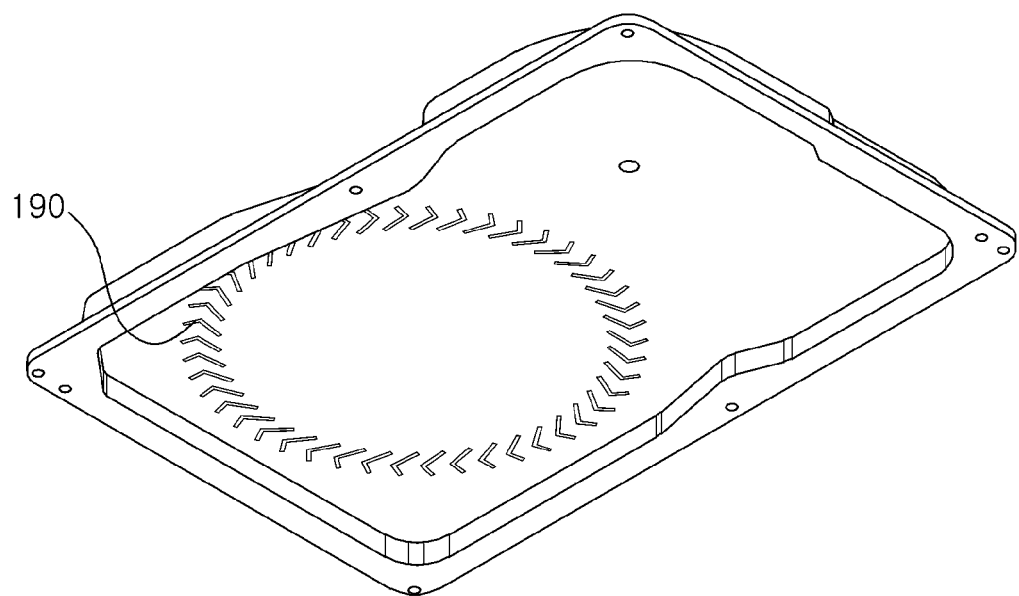

FIG. 3 illustrates a case in which the contact preventing portion 190 is formed of the dynamic pressure grooves having a spiral pattern. Alternatively, as shown in FIG. 5, the contact preventing portion 190 may also be formed of the dynamic pressure grooves having a herringbone pattern.

When the upper case 124 is manufactured by a press forming process, the contact preventing portion 190 may be simultaneously formed with the upper case 124 during the press forming press of the upper case 124.

For example, the contact preventing portion 190 formed of the dynamic pressure grooves may have a depth equal to or smaller than 100 μM and a width equal to or smaller than 100 μm.

Thus far, according to the present embodiment, the case in which the contact preventing portion 190 is formed on both the base member 122 and the upper case 124 has been described. However, the present invention is not limited thereto. Alternatively, the contact preventing portion 190 may be formed on any one of the base member 122 and the upper case 124.

As such, when the contact preventing portion 190 is formed on the base member 122 and the upper case 124, in a case in which the disk D is deformed due to an external shock, contact between the disk D and the base member 122, and contact between the disk D and the upper case 124 may be prevented.

Thus, damage to the disk D may be reduced.

In more detail, when the disk D is driven to rotate, the disk D may be deformed by an external shock. In this case, an interval between the disk D and the base member 122, and an interval between the disk D and the upper case 124 may become narrow, and the edge portion of the disk D may further be likely to contact the base member 122 and the upper case 124.

However, according to the present embodiment, since the contact preventing portion 190 formed of the dynamic pressure grooves is formed on the base member 122 and the upper case 124, dynamic pressure is generated by the contact preventing portion 190 when the disk D is deformed.

In addition, compressive force may be applied to the disk D due to the generated dynamic pressure, thereby preventing the edge portion of the disk D from contacting the base member 122 and the upper case 124 to reduce damage to the disk D.

The stator 140 rotatably supports the rotor 160. That is, the stator 140 may be a fixing member for rotatably supporting the rotor 160 and may include a sleeve 142, a cover member 144, a stator core 146, and so on.

As shown in FIG. 2, the sleeve 142 is fixedly installed on the installation portion 122a of the base member 122. That is, an outer circumferential surface of the sleeve 142 may be adhered to an inner circumferential surface of the installation portion 122a by press fitting and/or an adhesive.

In addition, the sleeve 142 may have a hollow cylindrical shape. In other words, the sleeve 142 may be shaped like a cylinder, including a shaft hole 142a formed therein.

The cover member 144 may be fixedly installed on a lower end portion of the sleeve 142. The cover member 144 prevents lubricating fluid provided in a bearing clearance, described below, from leaking toward a lower portion of the sleeve 142.

The stator core 146 is fixedly installed on an outer circumferential surface of the installation portion 122a. A coil 146a is wound around the stator core 146. The stator core 146 is described below in greater detail.

The rotor 160 may include a rotor hub 162 on which at least one disk D is installed. The rotor 160 may be a rotation member rotatably supported by the stator 140 and may include the rotor hub 162, a shaft 164, and so on.

The rotor hub 162 may be fixedly installed on an upper end portion of the shaft 164 and may rotate in connection with the shaft 164. The rotor hub 162 may include a body 162b having a through hole 162a formed therein through which the shaft 164 is penetrated, a magnet mounting portion 162c that extends from the body 162b, and a disk accommodation portion 162d that extends in a radial direction from the magnet mounting portion 162c and on which the disk D is accommodated.

A driving magnet 166 may be fixedly installed on the magnet mounting portion 162c and may face a front end of the stator core 146 around which the coil 146a is wound.

In addition, the driving magnet 166 may have a circular ring shape and may be a permanent magnet in which N and S poles are alternately magnetized in a circumferential direction to generate magnetic force having a uniform magnitude.

In this case, the driving of the rotor hub 162 is now described briefly. When power is supplied to the coil 146a wound around the stator core 146, driving force for rotating the rotor hub 162 is generated by electromagnetic interaction between the driving magnet 166 and the stator core 146 around which the coil 146a is wound.

Thus, the rotor hub 162 rotates, and the shaft 164, fixedly coupled to the rotor hub 162, rotates in conjunction with the rotor hub 162.

At least one disk D may be installed on the disk accommodation portion 162d. When a plurality of disks D are installed on the disk accommodation portion 162d, a spacer 166e may be installed between the plurality of disks D such that the plurality of disks D may be spaced apart from each other by a predetermined interval.

The disk D may be fixedly installed on the disk accommodation portion 162d by a clamp member 166f.

The shaft 164 is rotatably supported by the sleeve 142. That is, the shaft 164 is inserted into the shaft hole 142a of the sleeve 142. An outer circumferential surface of the shaft 164 and an inner circumferential surface of the sleeve 142 are spaced apart from each other by a predetermined interval to form a bearing clearance. In addition, lubricating fluid may be provided in the bearing clearance.

The actuator 180 may be rotatably installed on the actuator installation portion 122c of the base member 122. The actuator 180 may be included in a magnetic read/write head transfer part. Since the magnetic read/write head transfer part is well known to one of ordinary skill in the art, a detailed description thereof will not be given here.

The actuator 180 may include a suspension 182 for supporting a magnetic read/write head 181, an arm 184, rotatably coupled to a hinge axis 122d formed on the base member 122, and a bobbin portion (not shown) around which a driving coil (not shown) of a voice coil motor (not shown) is wound.

That is, the actuator 180 may move the magnetic read/write head 181 such that the magnetic read/write head 181 may read data recorded on a recording surface of the disk D or may write data to the recording surface.

In more detail, for example, when the disk D begins to rotate, the arm 184 rotates counterclockwise, the actuator 180 may move the magnetic read/write head 181 to the recording surface of the disk D. In addition, when the disk D stops rotating, the arm 184 rotates clockwise such that the magnetic read/write head 181 may deviate from the recording surface of the disk D.

According to the present embodiment, in order to reduce damage to the disk D, the housing 120 includes the contact preventing portion 190. Thus, detailed descriptions of the actuator 180, the rotor 160, and the stator 140, all of which would be well known to one of ordinary skill in the art, are not provided here.

As described above, since the contact preventing portion 190 formed of the dynamic pressure grooves is formed on the base member 122 and the upper case 124, when the disk D is deformed due to external shock, contact between the disk D and the base member 122, and contact between the disk D and the upper case 124 may be prevented.

Thus, damage to the disk D may be reduced.

In more detail, when the disk D is driven to rotate, the disk D may be deformed in the case of an external shock. In this case, an interval between the disk D and the base member 122, and an interval between the disk D and the upper case 124 may become narrow, and the edge portion of the disk D may further be likely to contact the base member 122 and the upper case 124.

However, according to the present embodiment, since the contact preventing portion 190 formed of the dynamic pressure grooves is formed on the base member 122 and the upper case 124, a dynamic pressure is generated by the contact preventing portion 190 when the disk D is deformed.

In addition, compressive force is applied to the disk D due to the generated dynamic pressure, thereby preventing the edge portion of the disk D from contacting the base member 122 and the upper case 124 to reduce damage to the disk D.

As set forth above, according to embodiments of the present invention, when a disk is positioned adjacent to a housing in the case of an external shock, an air dynamic pressure is generated through dynamic pressure grooves formed in the housing such that the disk may be spaced apart from the housing.

Accordingly, damage to the disk due to contact between the housing and the disk may be reduced.

While the present invention has been shown and described in connection with the embodiments, it will be apparent to those skilled in the art that modifications and variations can be made without departing from the spirit and scope of the invention as defined by the appended claims.

What is claimed is:

1. A recording disk driving device, comprising:
   a rotor including a rotor hub having at least one disk installed thereon;
   a stator rotatably supporting the rotor; and a housing including a base member having the stator fixedly installed thereon, and an upper case coupled to the base member to form an internal space, the housing being provided with a contact preventing portion formed on a surface of the housing, facing the disk, wherein the contact preventing portion is formed as a dynamic pressure groove and is disposed to face an edge portion of the disk.

2. The recording disk driving device of claim 1, wherein the dynamic pressure groove has a herringbone pattern or a spiral pattern.

3. The recording disk driving device of claim 2, wherein the dynamic pressure groove is formed in a rotation direction of the disk.

4. The recording disk driving device of claim 1, wherein the contact preventing portion is formed on at least one of an upper surface of the base member and a lower surface of the upper case.

* * * * *